(12) United States Patent
Joseph et al.

(10) Patent No.: US 11,176,606 B1
(45) Date of Patent: Nov. 16, 2021

(54) CATEGORIZING FINANCIAL TRANSACTIONS BASED ON SPENDING PATTERNS

(71) Applicant: INTUIT INC., Mountain View, CA (US)

(72) Inventors: Sony Joseph, Mountain View, CA (US); Ilya A. Izrailevsky, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 16/526,146

(22) Filed: Jul. 30, 2019

Related U.S. Application Data

(63) Continuation of application No. 14/031,831, filed on Sep. 19, 2013, now Pat. No. 10,521,856.

(51) Int. Cl.
*G06Q 40/00* (2012.01)
*G06Q 10/02* (2012.01)

(52) U.S. Cl.
CPC .......... *G06Q 40/00* (2013.01); *G06Q 10/02* (2013.01)

(58) Field of Classification Search
None
See application file for complete search history.

(56) References Cited

U.S. PATENT DOCUMENTS

| | | | |
|---|---|---|---|
| 7,840,456 B2 | 11/2010 | Patzer | |
| 8,554,592 B1* | 10/2013 | Merz | G06Q 30/02 705/7.11 |
| 8,600,783 B2 | 12/2013 | Smith et al. | |
| 8,600,873 B2* | 12/2013 | Fisher | G06Q 30/0185 705/38 |
| 9,754,318 B1* | 9/2017 | Spies | G06Q 20/10 |
| 2005/0197954 A1* | 9/2005 | Maitland | G06Q 20/10 705/39 |
| 2006/0191998 A1* | 8/2006 | Mueller | G06Q 40/12 235/379 |
| 2006/0237526 A1* | 10/2006 | Mueller | G06Q 20/04 235/379 |
| 2008/0301042 A1* | 12/2008 | Patzer | G06Q 30/06 705/39 |
| 2009/0114715 A1* | 5/2009 | Mueller | G06Q 20/042 235/379 |
| 2009/0198602 A1* | 8/2009 | Wang | G06Q 30/02 705/35 |
| 2009/0222364 A1* | 9/2009 | McGlynn | G06Q 40/02 705/30 |

(Continued)

*Primary Examiner* — William J Jacob
(74) *Attorney, Agent, or Firm* — Patterson + Sheridan, LLP

(57) ABSTRACT

During operation of a system, a financial transaction of an individual is associated with one or more predefined categories based on scores that indicate the likelihood of association. For example, a given predefined category may include a merchant name (such as the name of a potential counterparty in the financial transaction) and/or an attribute associated with one or more merchants. The score for a given predefined category may be determined based on a number of occurrences of the given predefined category in financial-transaction histories of a subset of a group of individuals who have common spending patterns in their financial-transaction histories. Moreover, the spending pattern may be based on values of financial transactions in the financial-transaction histories.

20 Claims, 10 Drawing Sheets

(56) References Cited

U.S. PATENT DOCUMENTS

| | | | |
|---|---|---|---|
| 2009/0222365 A1* | 9/2009 | McGlynn | G06Q 30/02 |
| | | | 705/30 |
| 2009/0234683 A1* | 9/2009 | Anderson | G06Q 20/10 |
| | | | 705/38 |
| 2010/0325014 A1* | 12/2010 | Widjojo | G06Q 30/0203 |
| | | | 705/26.35 |
| 2011/0137847 A1* | 6/2011 | Fahner | G06Q 40/02 |
| | | | 706/52 |
| 2012/0022945 A1* | 1/2012 | Falkenborg | G06Q 30/0255 |
| | | | 705/14.53 |
| 2014/0310159 A1 | 10/2014 | Zoldi et al. | |
| 2015/0066805 A1* | 3/2015 | Candee | G06Q 30/0282 |
| | | | 705/347 |
| 2017/0206597 A1* | 7/2017 | Bunnell | G06F 16/2465 |

* cited by examiner

CATEGORIZING FINANCIAL TRANSACTIONS BASED ON SPENDING PATTERNS

CROSS-REFERENCE TO RELATED APPLICATIONS

The present patent is a continuation of and hereby claims priority under 35 U.S.C. § 120 to pending U.S. patent application Ser. No. 14/031,831, filed on Sep. 19, 2013, the contents of which are incorporated herein in their entirety.

This application is also related to U.S. Pat. No. 9,542,710 entitled "Categorizing Financial Transactions Based on Business Preferences," by Ilya A. Izrailevsky and Sony Joseph, filed on Sep. 19, 2013; to U.S. patent application Ser. No. 14/031,811, entitled "Categorizing Financial Transactions Based on Spending Preferences," by Ilya A. Izrailevsky and Sony Joseph, filed on Sep. 19, 2013; and to U.S. patent application Ser. No. 14/031,821, entitled "Categorizing Financial Transactions Based on Location Preferences," by Sony Joseph and Ilya A. Izrailevsky, filed on Sep. 19, 2013, the contents of each of which are herein incorporated by reference in their entirety.

BACKGROUND

The present disclosure generally relates to computer-based techniques for categorizing financial transactions. More specifically, the present disclosure relates to a computer-based technique for categorizing financial transactions based on customer spending-pattern cohorts.

A wide variety of features in financial software can be enabled by assigning a financial transaction of a user to a predefined category (which is referred to as 'categorizing' the financial transaction). For example, by automatically categorizing the financial transaction for the user, manual entry of this information can be avoided. Moreover, once the financial transaction has been assigned to a predefined category, it may be easier to generate graphical and tabular summaries of the user's financial activity. In addition, information about categorized financial transactions can be leveraged by third parties (such as banks or financial institutions) that provide financial services, such as targeting of financial services to particular individuals based on the categorized financial transactions. Consequently, categorized financial transactions can improve the user experience when using the financial software and/or may comprise valuable information for the third parties.

However, it is often difficult to categorize financial transactions. For example, the information associated with a financial transaction (such as information included on a credit- or debit-card receipt) often does not uniquely specify a predefined category. Instead, a fragment or abbreviated name of a counterparty in the financial transaction may match several predefined categories. This ambiguity may degrade the usefulness of categorizing financial transactions.

SUMMARY

The disclosed embodiments relate to a computer system that categorizes a financial transaction. During operation, the computer system receives information specifying the financial transaction for an individual. Then, the computer system determines one or more scores indicating a likelihood that the financial transaction is associated with one or more predefined categories based on numbers of occurrences of the one or more predefined categories in financial-transaction histories of a subset of a group of individuals. Note that the individual is included in the subset, the subset includes two or more individuals having a common spending pattern in the financial-transaction histories, and the spending pattern is based on values of financial transactions in the financial-transaction histories.

Moreover, the information may identify a potential counterparty in the financial transaction. More specifically, determining the one or more scores may involve comparing the counterparty to a set of predefined categories to identify the one or more predefined categories, where a given predefined category includes: a merchant name and/or an attribute associated with one or more merchants. Additionally, a score of the given predefined category may correspond to a number of occurrences of the given predefined category in the financial-transaction histories. In some embodiments, a score of the given predefined category is normalized by the numbers of occurrences of the one or more predefined categories in the financial-transaction histories.

Note that the information may include a value of the financial transaction. Moreover, the value of the financial transaction may be used to determine the subset based on the common spending pattern.

In some embodiments, the computer system assigns the individual to the group based on an analysis of the financial-transaction histories of the individual and of the group. Furthermore, assigning the individual to the group of individuals may include: identifying multiple groups of individuals by performing a clustering analysis of financial transactions in the financial-transaction histories of the individuals in the multiple groups of individuals using an unsupervised-learning technique; determining distance values between the financial transactions in the financial-transaction histories of the individual and the financial transactions in the financial-transaction histories of the multiple groups of individuals; and assigning the individual to the group of individuals based on the determined distance values.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for categorizing a financial transaction, and a computer-program product (e.g., software) for use with the computer system are described. During this financial technique, a financial transaction of an individual is associated with one or more predefined categories based on scores that indicate the likelihood of association. For example, a given predefined category may include a merchant name (such as the name of a potential counterparty in the financial transaction) and/or an attribute associated with one or more merchants. The score for a given predefined category may be determined based on a number of occurrences of the given predefined category in financial-transaction histories of a subset of a group of individuals who have common spending patterns in their financial-transaction histories. Moreover, the spending pattern may be based on values of financial transactions in the financial-transaction histories.

By categorizing the financial transaction, the financial technique may reduce ambiguity and improve the accuracy of the determined one or more predefined categories. This capability may reduce or eliminate the need for manual entry of one or more categories associated with the financial transaction by the individual, which, in turn, may facilitate graphical and tabular summaries of the individual's financial activity. In addition, the categorized financial transaction may facilitate improved financial services, such as targeting of financial services to the individual. Consequently, the financial technique may improve the user experience when using financial software, may reduce actual and opportunity costs by facilitating improved targeting, and/or may promote commercial activity.

In the discussion that follows, a user may include: an individual or a person (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc. Additionally, a financial transaction may involve a product or a service (such as medical care) that is paid for using a type of currency, an asset and/or by barter. The financial transaction may be conducted by an individual and/or a business.

Figure 1:
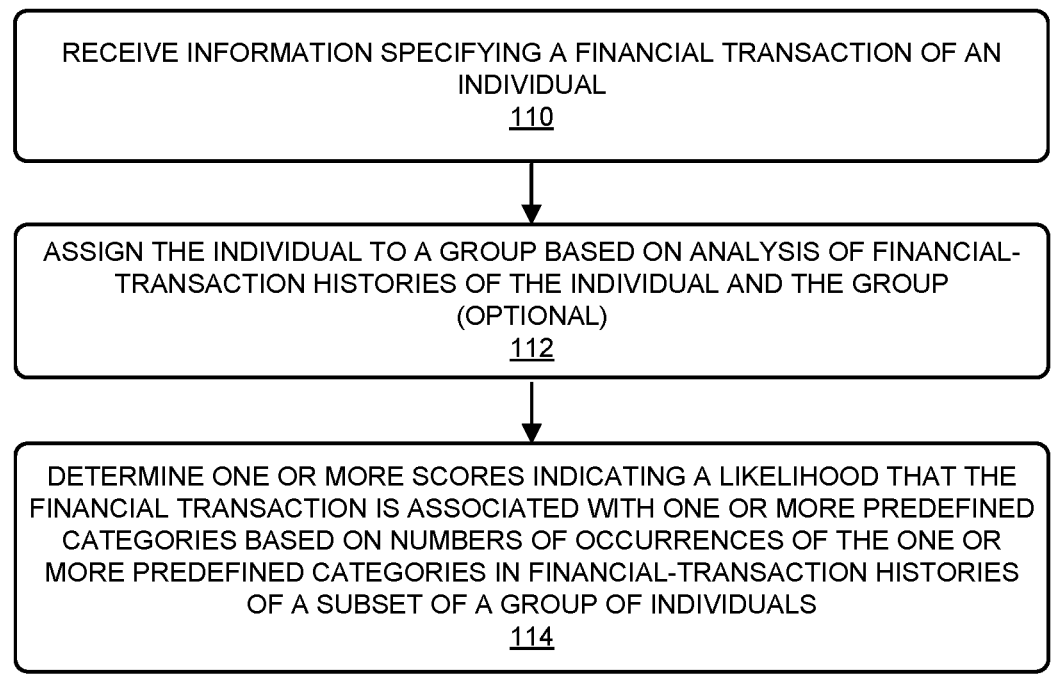
FIG. 1 is a flow chart illustrating a method for categorizing a financial transaction in accordance with an embodiment of the present disclosure.

We now describe embodiments of the financial technique. FIG. 1 presents a flow chart illustrating a method 100 for categorizing a financial transaction, which may be performed by a computer system (such as computer system 1000 in FIG. 10). During operation, the computer system receives information specifying the financial transaction for an individual (operation 110). For example, the information may include a receipt for the financial transaction, which may include: the date and time of the financial transaction, the location of the financial transaction, the amount or value of the financial transaction, and at least a fragment or portion of a merchant or counterparty's name in the financial transaction.

Then, the computer system determines one or more scores indicating a likelihood that the financial transaction is associated with one or more predefined categories based on numbers of occurrences of the one or more predefined categories in financial-transaction histories of a subset of a group of individuals (operation 114). Note that the individual is included in the subset, and the subset includes two or more individuals having a common spending pattern in the financial-transaction histories (i.e., the group may be subdivided based on spending patterns of the individuals, so that similar individuals are clustered in subsets of the group, thereby facilitating comparisons of individuals with similar behaviors). This spending pattern may be based on values of financial transactions in the financial-transaction histories (e.g., the subset may include individuals who spend similar amounts of money in financial transactions).

As noted previously, the information may identify a potential counterparty in the financial transaction. Furthermore, determining the one or more scores (operation 114) may involve comparing the counterparty to a set of predefined categories (e.g., by comparing characters) to identify the one or more predefined categories, and a given predefined category includes: a merchant name and/or an attribute associated with one or more merchants (such as a type of business, e.g., restaurants). Additionally, a score of the given predefined category corresponds to a number of occurrences of the given predefined category in the financial-transaction histories. For example, the score may be larger if the given predefined category occurs more often in the financial-transaction histories than other predefined categories. In some embodiments, a score of the given predefined category is normalized by the numbers of occurrences of the one or more predefined categories in the financial-transaction histories (e.g., the maximum score may be a number between zero and one).

Moreover, as noted previously, the information may include a value of the financial transaction. The value of the financial transaction may be used to determine the relevant subset to use when determining the one or more scores based on the common spending pattern.

In some embodiments, the computer system optionally assigns the individual to the group based on an analysis of the financial-transaction histories of the individual and of the group (operation 112). Furthermore, assigning the individual to the group of individuals may include: identifying multiple groups of individuals by performing a clustering analysis of financial transactions in the financial-transaction histories of the individuals in the multiple groups of individuals using an unsupervised-learning technique; determining distance values between the financial transactions in the financial-transaction histories of the individual and the financial transactions in the financial-transaction histories of the multiple groups of individuals; and assigning the individual to the group of individuals based on the determined distance values.

Figure 2:
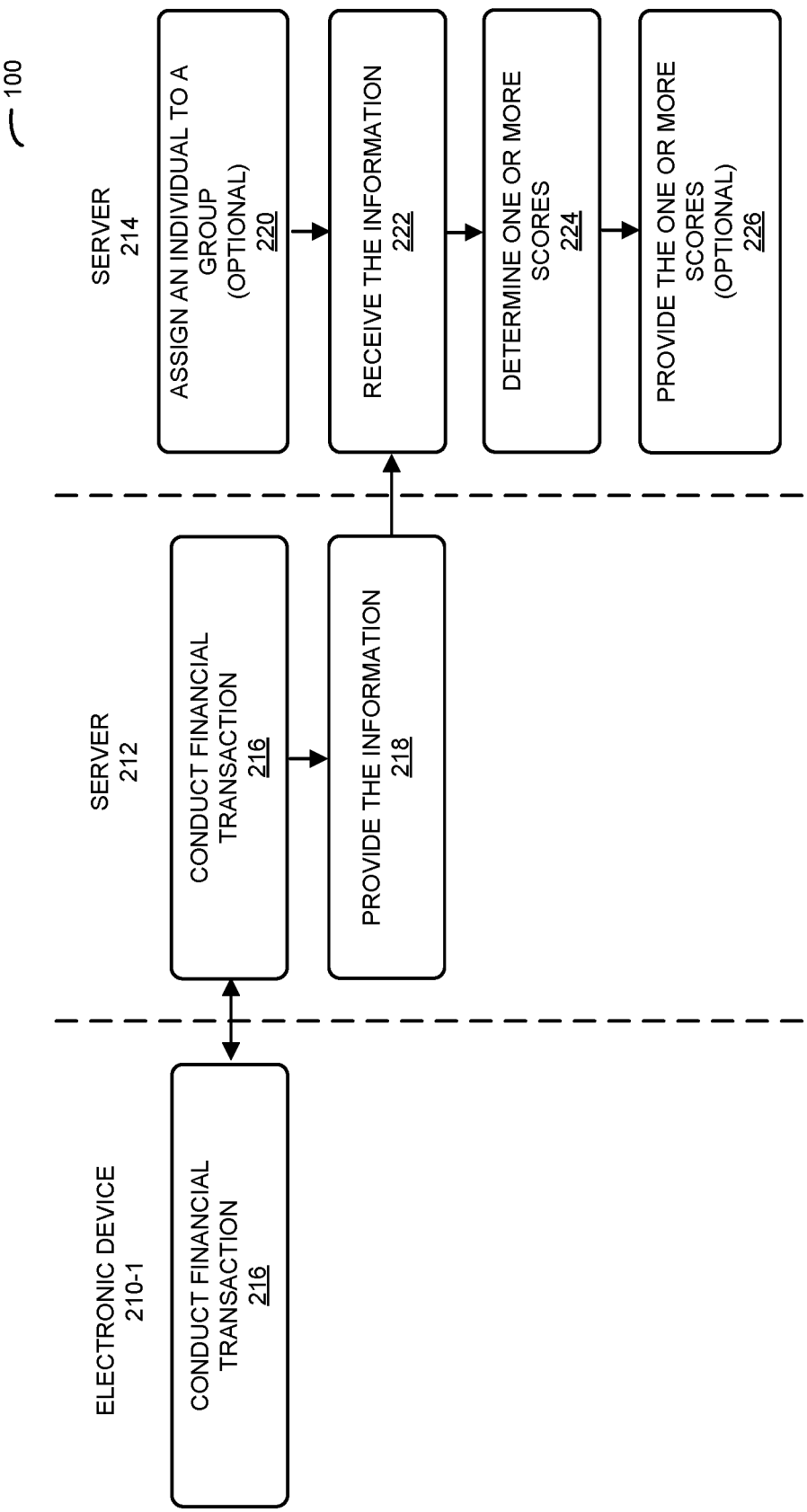
FIG. 2 is a flow chart illustrating the method of FIG. 1 in accordance with an embodiment of the present disclosure.

In an exemplary embodiment, the financial technique is implemented using one or more electronic devices (such as a computer or a portable electronic device, e.g., a cellular telephone) and one or more servers (such as a computer or a computer system), which communicate through a network, such as a cellular-telephone network and/or the Internet. This is illustrated in FIG. 2, which presents a flow chart illustrating method 100 (FIG. 1).

During the method, a user of electronic device 210-1 (such as the individual) may conduct a financial transaction (operation 216) with a counterparty. The financial transaction may be conducted electronically via electronic device 210-1. (However, in other embodiments the individual conducts the financial transaction in person.) For example, the user may conduct the financial transaction using: cash, a check, a credit card, a debit card and, more generally, a financial vehicle. Server 212, which is associated with the counterparty or a financial institution that provides the financial vehicle, may provide the information (operation 218) specifying the financial transaction to server 214 (which is associated with a provider of the financial technique).

After receiving the information (operation 222), server 214 may determine the one or more scores (operation 224) indicating the likelihood that the financial transaction is associated with the one or more predefined categories based on the numbers of occurrences of the one or more predefined categories in financial-transaction histories of a subset of a group of individuals.

Then, server 214 may optionally provide the one or more scores (operation 226) and the associated predefined categories to a third party (not shown), such as one or more banks and, more generally, one or more financial institutions. This third party may compensate the provider of the financial technique for the categorization of the financial transaction.

In some embodiments, prior to receiving the information (operation 222), server 214 optionally assigns the individual to the group (operation 220) based on an analysis of the financial-transaction histories of the individual and of the group.

In an exemplary embodiment, the financial technique enables categorization, in which financial transactions are associated with predefined categories. In addition to functional benefits (such as graphical and tabular summaries of the individuals' financial activities), this capability can significantly improve the customer experience when using financial software, such as income-tax software and/or accounting software.

In contrast with existing approaches that compare the name similarity of merchants, the location of a financial transactions, and keywords that occur in descriptions of the financial transactions to infer the category associated with the financial transaction, in the financial technique improved categorization (with enhanced coverage and accuracy) is obtained using data mining, as well as other financial-transaction signal identification and processing techniques. In particular, one or more unique aspects of the data associated with the financial transactions (such as inferred cohort preferences) are used to disambiguate the predefined categories associated with the financial transactions.

For example, in the financial technique cohorts or segments of users may initially be identified based on the financial-spending behavior of the users. These user-segment cohorts or groups may be identified based on a number of parameters, which may include: the merchants the users visited, when the users visited the merchants, the average amount spent by the users, and/or the frequency of the users' spending. In some embodiments, additional user demographic data is used to augment the user-segment cohorts.

Then, the merchant-to-category mapping of the users within a user-segment cohort is aggregated and normalized for that user-segment cohort. These maps may be used to create implicit community rules, as opposed to explicit ones that the users specify. For example, as described further below, the mapping may be based on the spending patterns of the users (and, more generally, user behavior patterns). Note that, if one user in the user-segment cohort has a financial transaction that cannot be associated with one or more predefined categories by direct comparison of the information specifying the financial transaction with the one or more predefined categories, then the categorization data (such as the maps) from the other users in the same user-segment cohort may be used to categorize the financial transaction.

Thus, by leveraging user-segment cohorts (that are identified based on similar behavior patterns) to extract the category preferences of these user-segment cohorts, financial transactions that could not previously be categorized can be disambiguated.

As an illustration of the financial technique, a user-segment cohort may be identified for users who frequent fast-food restaurants at least five times a month, and who spend, on average, $20-$30. Most of the users in this user-segment cohort may have previous financial transactions in which the merchant 'Costco' is assigned or associated with a predefined category entitled 'food.'

Subsequently, one of the users in the user-segment cohort may have a financial transaction with 'Costco' that could not be categorized based on the information specifying the financial transaction. By using the financial-transaction histories of the user-segment cohort, an association with the predefined category entitled 'food' may be determined for this financial transaction, as opposed to the predefined categories of 'electronics' or 'grocery.'

In general, when disambiguating the categorization of a financial transaction, the spending-pattern score of a user u in a user-segment cohort to a predefined category c may be calculated as $$\text{Spend-Pattern Score}(u,c) = \text{TF}(c \text{ in cohort categories}(u)) \cdot \text{IDF}(c),$$

where $\text{TF}(c \text{ in cohort categories}(u)) = (\text{term frequency}(c \text{ in cohort categories}(u)))^{1/2}$ and $$\text{IDF}(c) = 1 + \log(N/(N(c)+1)),$$

where cohort categories(u) includes the categories in the user-segment cohort, N is the number of users in the user-segment cohort, and N(c) is the number of users in the user-segment cohort that have used predefined category c at least once. The spending-pattern score is proportional to the number of times the predefined category c appears in the user-segment cohort of user u, but is offset by the frequency of the predefined category across all the users in the user-segment cohort. This helps to control for the fact that some predefined categories are too generic or are more common than others.

In an exemplary embodiment, there is a financial transaction that cannot be accurately categorized based on the merchant name. For example, 'Costco' may be difficult to categorize because they sell a wide variety of products. In this case, a user-segment cohort may be used to categorize the financial transaction by generating a probability score that a given predefined category is associated with the financial transaction. Thus, a financial transaction with a merchant identified as 'Alxfd' in the information may be associated with 'Alexander steakhouse' and 'Alexander electronics.' If the user-segment cohort prefers upscale restaurants with an average bill greater than $400, then 'Alexander steakhouse' is a more-likely predefined category. The financial technique may be used to determine a normalized score or weight for each predefined category or for those predefined categories that approximately match 'Alxfd'

(such as those with Levenshtein distances less than a threshold, e.g., a difference of three characters).

More generally, the users in the user-segment cohort may be binned or subdivided based on their spending. Thus, users that spend more than a first amount, on average, per financial transaction and less than a second amount, on average, per financial transaction may be clustered in a subset. Subsequently, when categorizing a financial transaction having an associated amount or value between the first amount and the second amount, the financial transactions in a financial-transaction history of the users in the subset may be used to determine the one or more scores.

In general, a wide variety of factors may be used in determining the one or more scores. Moreover, the score for a given predefined category may be a weighted summation of the scores or weights for the different factors. In the discussion that follows, embodiments of the financial technique that use several different factors are described. The resulting scores or weights for these factors may be used independently or in conjunction with each other to determine the associations of the predefined categories and financial transactions.

In another embodiment, a business-size preference of an individual (as opposed to the group or the subset of the group) is used to categorize the financial transaction in the financial technique. This embodiment of the financial technique is based on the fact that some individuals prefer local merchants to national chains. Thus, if 75% of the financial transactions in the financial-transaction history of an individual are with local merchants, and there are two possible predefined categories associated with a financial transaction (one local and one a national chain), the scores for these two predefined categories are, respectively, 0.75 and 0.25. Similarly, if an individual has a preference for a particular predefined category in the financial transactions in the financial-transaction history of the individual, this preference may be used to determine the scores of the predefined categories.

Figure 3:
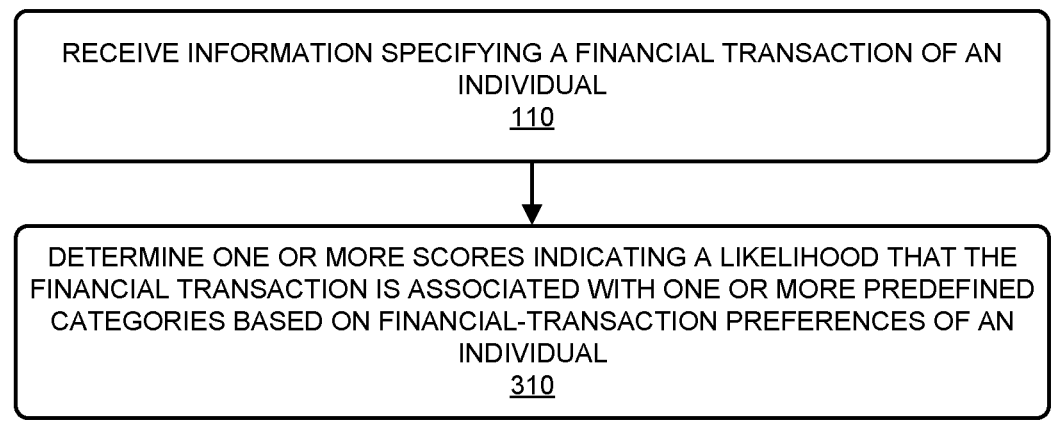
FIG. 3 is a flow chart illustrating a method for categorizing a financial transaction in accordance with an embodiment of the present disclosure.
Figure 10:
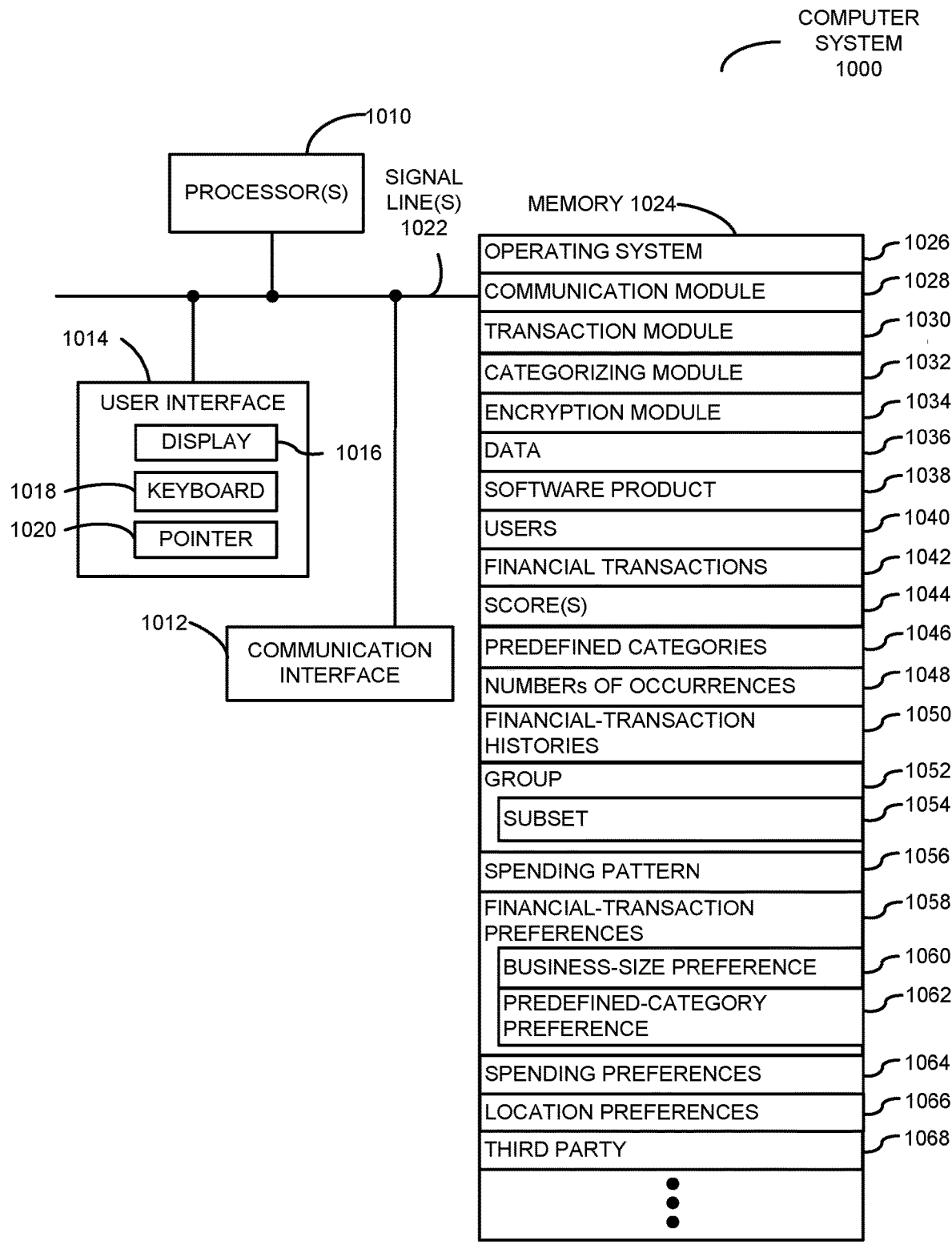
FIG. 10 is a block diagram illustrating a computer system that performs the methods of FIGS. 1-8 in accordance with an embodiment of the present disclosure.

This financial technique is shown in FIG. 3, which presents a flow chart illustrating a method 300 for categorizing a financial transaction This method may be performed by a computer system (such as computer system 1000 in FIG. 10). During operation, the computer system receives information specifying the financial transaction for an individual (operation 110). Then, the computer system determines one or more scores indicating a likelihood that the financial transaction is associated with one or more predefined categories based on financial-transaction preferences of the individual (operation 310), where the financial-transaction preferences are specified by a financial-transaction hi story of the individual.

As in method 100 (FIGS. 1 and 2), the information may identify a potential counterparty in the financial transaction. Moreover, determining the one or more scores (operation 310) may involve comparing the counterparty to a set of predefined categories (e.g., by comparing characters) to identify the one or more predefined categories, where a given predefined category includes: a merchant name and/or an attribute associated with one or more merchants (such as a type of business, e.g., restaurants).

Alternatively or additionally, the information may specify a type of the counterparty, where the one or more scores are based on a number of occurrences of the type of the counterparty in the financial-transaction history. A score of the given predefined category may be normalized by the numbers of occurrences of the one or more predefined categories in the financial-transaction history (so that the scores are between zero and one). Furthermore, the type of the counterparty may include: a business having one or more establishments in a geographic area, and/or a business having multiple establishments in a second geographic area that is larger than the geographic area and that includes the first geographic area. Thus, the business may be local or part of a national chain. In this way, if the individual has a preference for 'local' businesses in their financial-transaction history, this may be used to determine the scores of the predefined categories when there is ambiguity.

In some embodiments, the one or more scores are based on numbers of occurrences of the one or more predefined categories in the financial-transaction history. Moreover, a score of the given predefined category may be normalized by the numbers of occurrences of the one or more predefined categories in the financial-transaction history. In this way, if the individual has a preference for one or more predefined categories in their financial-transaction history, this may be used to determine the scores of the predefined categories when there is ambiguity. For example, the scores may, at least in part, be determined by the frequencies of occurrences of the predefined categories in the financial-transaction history.

Figure 4:
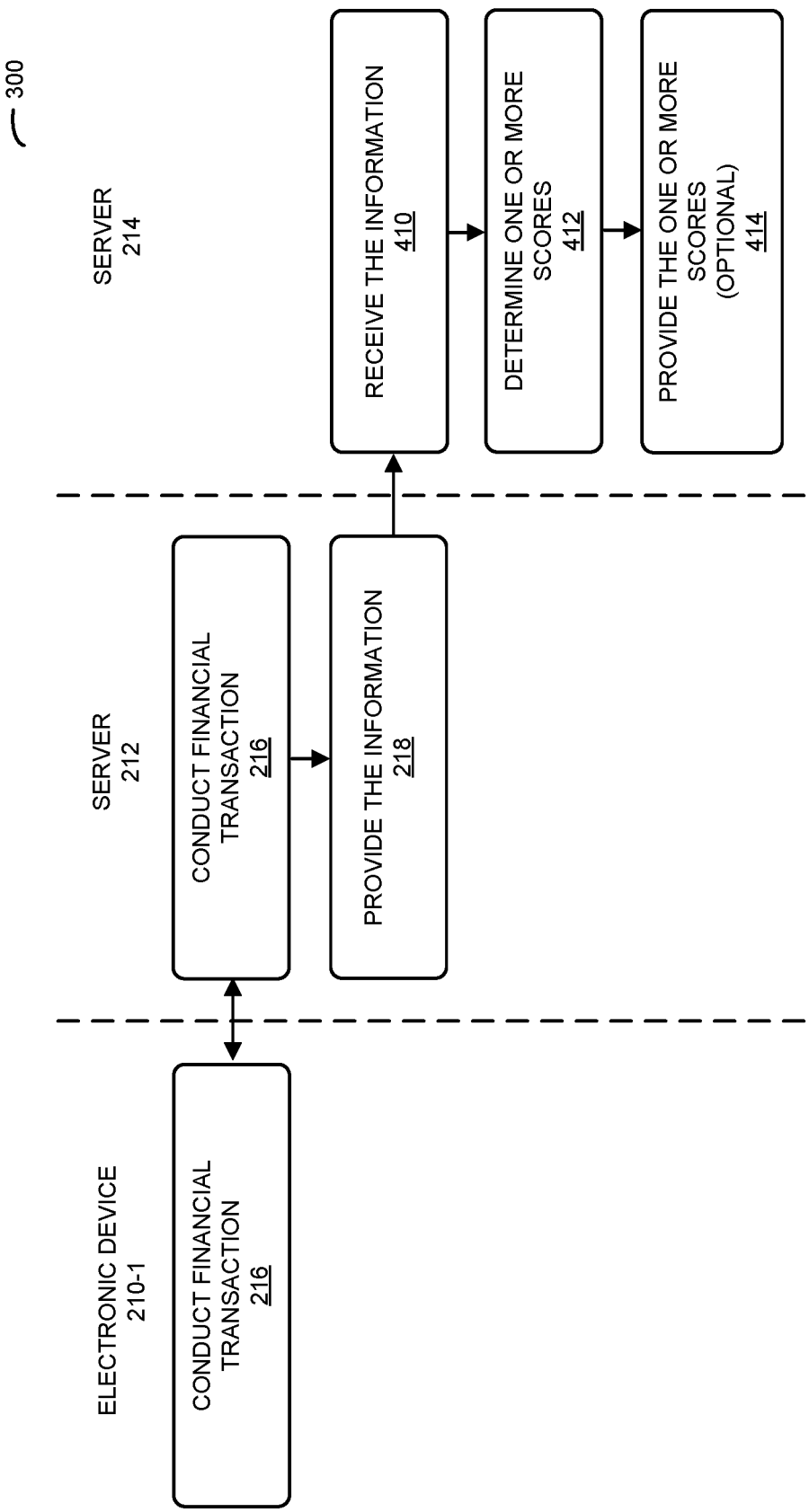
FIG. 4 is a flow chart illustrating the method of FIG. 3 in accordance with an embodiment of the present disclosure.

In an exemplary embodiment, the financial technique is implemented using one or more electronic devices (such as a computer or a portable electronic device, e.g., a cellular telephone) and one or more servers (such as a computer or a computer system), which communicate through a network, such as a cellular-telephone network and/or the Internet. This is illustrated in FIG. 4, which presents a flow chart illustrating method 300 (FIG. 3).

During the method, the user of electronic device 210-1 (such as the individual) may conduct the financial transaction (operation 216) with the counterparty. The financial transaction may be conducted electronically via electronic device 210-1. Server 212, which is associated with the counterparty or the financial institution that provides a financial vehicle, may convey the information (operation 218) specifying the financial transaction to server 214 (which is associated with the provider of the financial technique).

After receiving the information (operation 410), server 214 may determine the one or more scores (operation 412) indicating the likelihood that the financial transaction is associated with the one or more predefined categories based on the financial-transaction preferences of the individual.

Then, server 214 may optionally provide the one or more scores (operation 414) and the associated predefined categories to the third party (not shown).

In an exemplary embodiment, the financial technique identifies a business-size and/or a predefined-category preference of the user. This preference may be based on the user's customers and vendors, as specified in their financial-transaction history.

For example, the size of a business may be determined by parameters such as the number of employees at the business and its annual revenue. This business information may be determined or inferred by accessing a business-listings database. The business sizes may be normalized across other businesses in the same area (or geographic region) and/or other businesses with which the user conducts business.

Subsequently, if the user conducts a financial transaction that cannot be categorized, the user's business-size preference may be used to categorize the financial transaction. For example, if there are two possible predefined categories associated with the financial transaction (such as those that approximately match the counterparty name in the financial transaction), and the user has a strong preference for local businesses or small businesses in their financial-transaction history, this preference may be used to determine the relative weights of the two possible predefined categories.

Thus, the business-size preference of a user may be identified as 10 employees and $200,000 annual revenue based on the previous financial transactions in their financial-transaction history. This preference may indicate that the user tends to shop at local stores and restaurants (as opposed to large chains). If a subsequent financial transaction is associated with the merchant name 'Coupa,' which cannot be categorized based on the existing information associated with the financial transaction, the identified business-size preference may be used to orient and disambiguate the predefined category more toward a predefined category of 'Coffee Shops' instead of a predefined category of 'Software Design.' This is because the predefined category of 'Coupa Café,' a merchant with $150,000 in annual revenue, is chosen over the predefined category of 'Coupa Software,' a merchant with $4,500,000 in annual revenue.

Alternatively or additionally, the category preference of the user may be determined using the user's financial-transaction history. For example, the category preference may be determined by analyzing the number of times a particular predefined category appears in the user's financial-transaction history. This category preference may be normalized across those of other users in the same area (or geographic region) and/or based on the other predefined categories with which the user conducts business.

Subsequently, if the user conducts a financial transaction that cannot be categorized, the user's category preference may be used to categorize the financial transaction. For example, if there are two possible predefined categories associated with the financial transaction (such as those that approximately match the counterparty name in the financial transaction), and the user has a strong preference for a particular predefined category in their financial-transaction history, this preference may be used to determine the relative weights of the two possible predefined categories.

Thus, the category preference of a user may be identified as 'Bakeries,' as opposed to 'Fast-Food Restaurants,' based on the previous financial transactions in their financial-transaction history. This preference may indicate that the user tends to go to bakeries for breakfast, as opposed to fast-food establishments. If a subsequent financial transaction is associated with the merchant name ' Soda Inc.,' which cannot be categorized based on the existing information associated with the financial transaction, the identified category preference may be used to orient and disambiguate the predefined category more toward a predefined category of 'Bakeries,' instead of 'Fast-Food Restaurants.' This is because 'Soda Inc.' occurs as both a bakery and a fast-food restaurant in the predefined categories.

Note that the score of a user u to a business b based on the business-size preference for disambiguating financial-transaction categories may be calculated as $$Score(u,b) = NormalizedAcrossUsersSize(u,b) \cdot NormalizedAcrossBusinessesSize(u,b),$$

where $NormalizedAcrossUsersSize(u,b) = \log(1+S(b)/S_{avg}(u))$, and $$NormalizedAcrossBusinessesSize(u,b) = S(b)/S_{avg},$$

where $S(b)$ equals the size/number of employees and annual revenue of business b, $S_{avg}(u)$ equals the average size/number of employees and annual revenue of businesses with which user u conducts business, and $S_{avg}$ equals the average size/number of employees and annual revenue at all known businesses in the area (e.g. within X miles). In this analysis, the normalized business size is normalized across all businesses in the area, as well as across the financial-transaction history of the user u.

Similarly, the score of user u to a predefined category c based on their category preference(s) for disambiguating financial-transaction categories may be calculated as:

$$core(u,c) = TF(c \text{ in category}(u)) \cdot IDF(category(c)),$$

where $TF(c \text{ in category}(u)) = (\text{term frequency}(c \text{ in category}(u)))^{1/2}$, and $$IDF(c) = 1 + \log(N/(N(c)+1)),$$

where category(u) equals predefined categories from the financial-transaction history of user u, term frequency(c in category(u)) equals the number of times predefined category c occurs in the financial-transaction categories of user u, N equals the total number of users in the area (e.g. within X miles), and N(c) equals the number of users in the area who have used predefined category c at least once. In this analysis, the score is proportional to the number of times the predefined category c appears in the financial-transaction history of user u, but is offset by the frequency of the predefined category across all users. This helps to control for the fact that some predefined categories are too generic or are more common than others.

Figure 5:
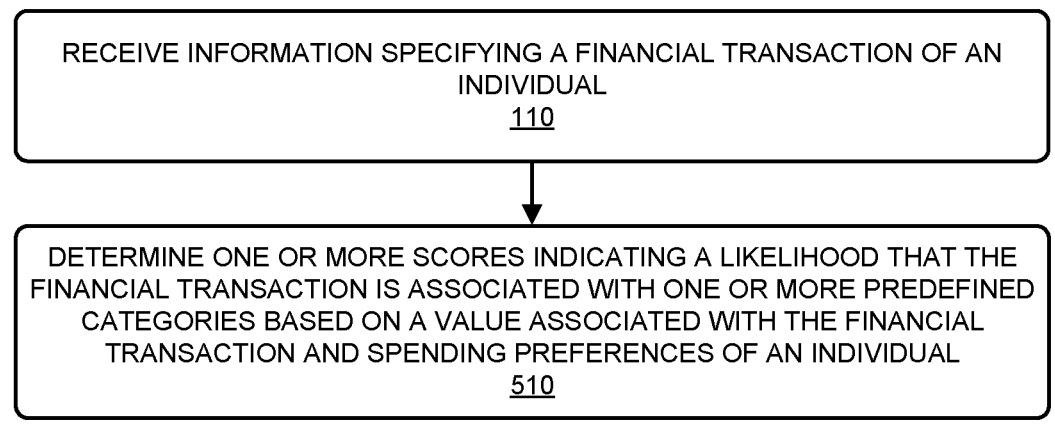
FIG. 5 is a flow chart illustrating a method for categorizing a financial transaction in accordance with an embodiment of the present disclosure.

In another embodiment, an individual's spending volume or preference(s) (i.e., the amount the individual spends, on average, at a given merchant or for a given predefined category) is used to categorize the financial transaction in the financial technique. This is shown in FIG. 5, which presents a flow chart illustrating a method 500 for categorizing a financial transaction. This method may be performed by a computer system (such as computer system 1000 in FIG. 10). During operation, the computer system receives information specifying the financial transaction for an individual (operation 110), where the information includes a value or amount associated with the financial transaction. Then, the computer system determines one or more scores indicating a likelihood that the financial transaction is associated with one or more predefined categories based on the value and spending preferences of the individual (operation 510), where the spending preferences are specified by a financial-transaction history of the individual.

As in methods 100 (FIGS. 1 and 2) and 300 (FIGS. 3 and 4), the information may identify a potential counterparty in the financial transaction. Moreover, determining the one or more scores (operation 510) may involve comparing the counterparty to a set of predefined categories (e.g., by comparing characters) to identify the one or more predefined categories, where a given predefined category includes: a merchant name and/or an attribute associated with one or more merchants (such as a type of business, e.g., restaurants).

Alternatively or additionally, the spending preferences may include values associated with the financial-transaction history. For example, the one or more scores may be Bayesian probabilities in which the a priori probabilities are based on the spending preferences in the individual's financial-transaction history.

Furthermore, the one or more scores may be determined based on a position of the value in a distribution of the values associated with the financial-transaction history. For example, if the value associated with the financial transaction is well above the mean spending preference(s) for the individual, predefined categories associated with luxury merchants may more likely be associated with the financial transaction than predefined categories associated with low-cost merchants.

Figure 6:
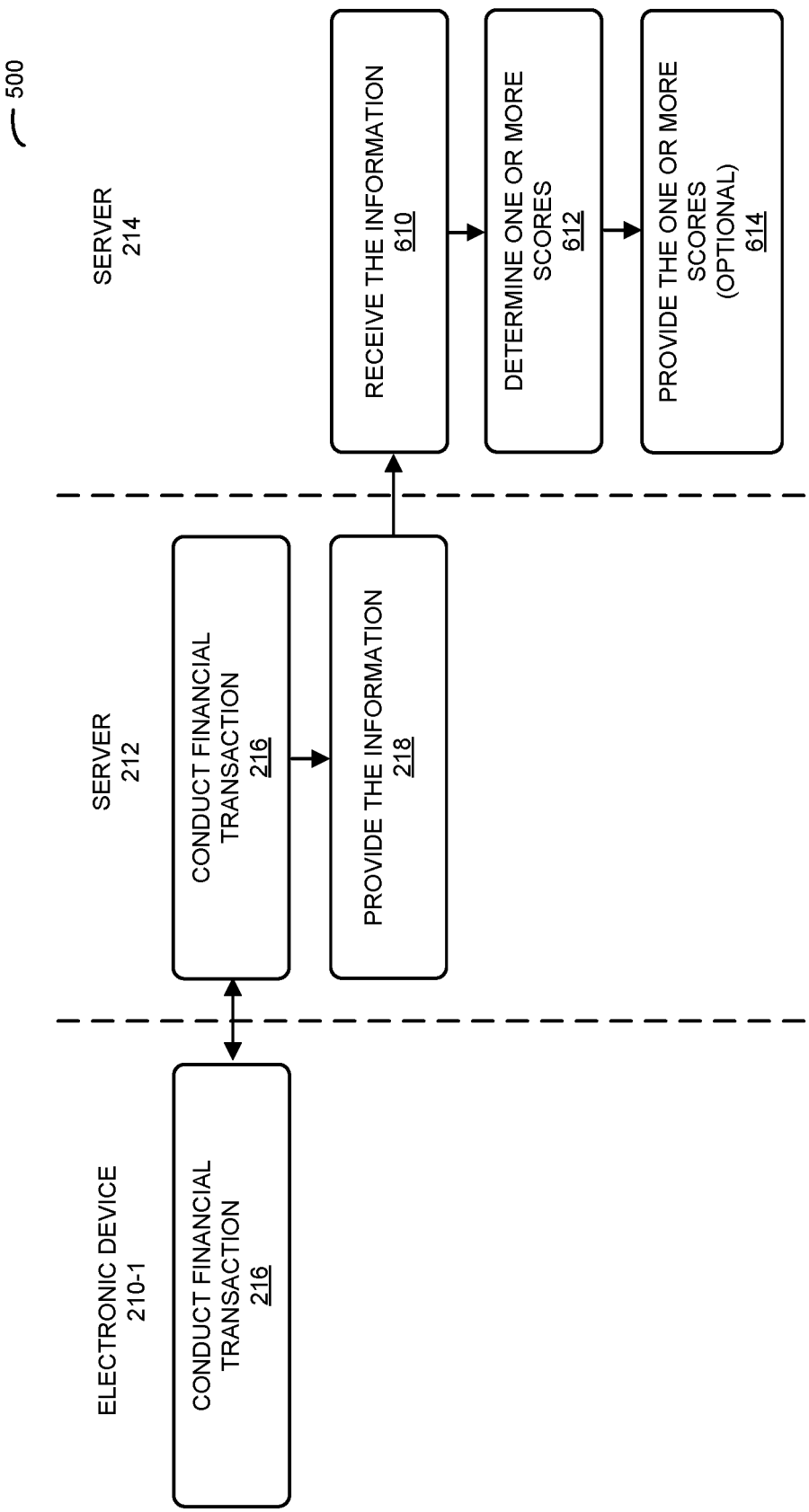
FIG. 6 is a flow chart illustrating the method of FIG. 5 in accordance with an embodiment of the present disclosure.

In an exemplary embodiment, the financial technique is implemented using one or more electronic devices (such as a computer or a portable electronic device, e.g., a cellular telephone) and one or more servers (such as a computer or a computer system), which communicate through a network, such as a cellular-telephone network and/or the Internet. This is illustrated in FIG. 6, which presents a flow chart illustrating method 500 (FIG. 5).

During the method, the user of electronic device 210-1 (such as the individual) may conduct the financial transaction (operation 216) with the counterparty. The financial transaction may be conducted electronically via electronic device 210-1. Server 212, which is associated with the counterparty or the financial institution that provides a financial vehicle, may convey the information (operation 218) specifying the financial transaction to server 214 (which is associated with the provider of the financial technique).

After receiving the information (operation 610), server 214 may determine the one or more scores (operation 612) indicating the likelihood that the financial transaction is associated with the one or more predefined categories based on the spending preferences of the individual.

Then, server 214 may optionally provide the one or more scores (operation 614) and the associated predefined categories to the third party (not shown).

In an exemplary embodiment, the financial technique identifies the spending preferences of the user based on their financial-transaction history. In particular, the spending preference may be determined by calculating the amount of money the user spends while shopping or going out to a restaurant (and, more generally, in financial transactions with a merchant). Then, the average amount of money spent by all users who visit this merchant is determined. The spending preference may be normalized across other businesses in the same area (or geographic region) and other businesses with which the user conducts business.

Subsequently, if the user conducts a financial transaction that cannot be categorized, the user's spending preferences may be used to categorize the financial transaction. For example, if there are two possible predefined categories associated with the financial transaction (such as those that approximately match the counterparty name in the financial transaction), and if the value or amount associated with a financial transaction exceeds a threshold in their financial-transaction history, the user has a spending preference for a particular predefined category. This spending preference may be used to determine the relative weights of the two possible predefined categories based on the value of the financial transaction.

Thus, a user's spending preference, on average, may be identified as $8.50 per financial transaction based on the previous financial transactions in their financial-transaction history. Consequently, it may be more likely that the user tends to eat at fast-food restaurants than more expensive restaurants. If the user subsequently conducts a financial transaction with the merchant name 'Burger' that cannot be categorized based on the information associated with the financial transaction, the spending preference can be used to orient and disambiguate the predefined category more toward the predefined category of 'fast-food restaurants' than the predefined category of 'full-service restaurants.'

Note that the score based on the spending preference of a user u to a business b for disambiguating financial-transaction categories may be calculated as:

Spend($u,b$)=NormalizedAcrossUsersSpend($u,b$)·NormalizedAcrossBusinessesSpend($u,b$), where NormalizedAcrossUsersSpend($u,b$)=log(1+$S(u,b)/S_{avg}(b)$), and NormalizedAcrossBusinessesSpend($u,b$)=$S(u,b)/S(u)$, where $S(u, b)$ equals the spend volume/money spent by user u at business b, $S_{avg}(b)$ equals the average spend volume/money spent by all users who visited business b, and $S(u)$ equals the spend volume/money spent by user u across all businesses with which they conduct business. In this analysis, the normalized spending preference normalizes users for that business, as well as for the user across all businesses.

Figure 7:
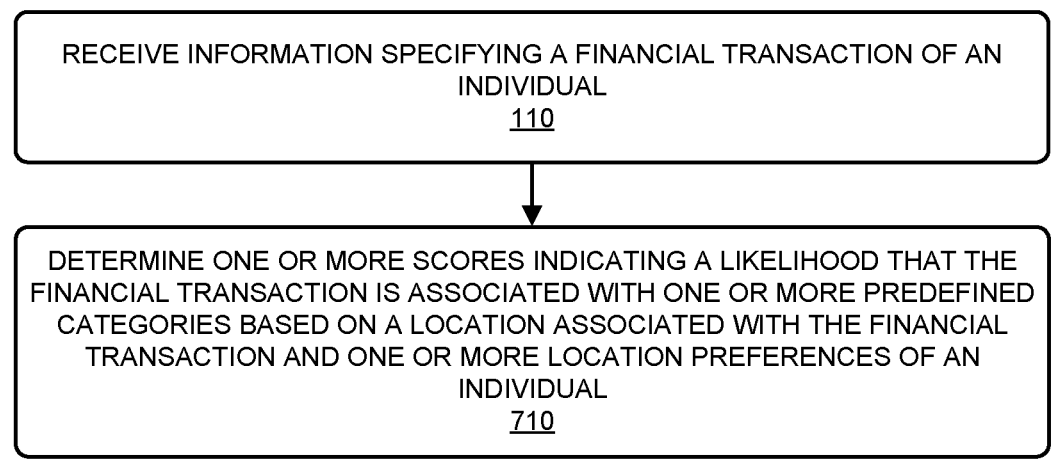
FIG. 7 is a flow chart illustrating a method for categorizing a financial transaction in accordance with an embodiment of the present disclosure.

In another embodiment, the location preferences of an individual and the location of a financial transaction are used to categorize the financial transaction in the financial technique. This is shown in FIG. 7, which presents a flow chart illustrating a method 700 for categorizing a financial transaction. This method may be performed by a computer system (such as computer system 1000 in FIG. 10). During operation, the computer system receives information specifying the financial transaction for an individual (operation 110), where the information includes a location associated with the financial transaction. Then, the computer system determines one or more scores indicating a likelihood that the financial transaction is associated with one or more predefined categories based on the location associated with the financial transaction and one or more location preferences of the individual (operation 710), where the one or more location preferences are specified by a financial-transaction history of the individual.

As in methods 100 (FIGS. 1 and 2), 300 (FIGS. 3 and 4) and 500 (FIGS. 5 and 6), the information may identify a potential counterparty in the financial transaction. Moreover, determining the one or more scores (operation 710) may involve comparing the counterparty to a set of predefined categories (e.g., by comparing characters) to identify the one or more predefined categories, where a given predefined category includes: a merchant name and/or an attribute associated with one or more merchants (such as a type of business, e.g., restaurants).

Furthermore, the location preferences may correspond to locations associated with the financial transactions in the financial-transaction history. Additionally, the one or more scores may be determined by comparing the location associated with the financial transaction and the one or more location preferences of the individual to identify a matching location preference. In some embodiments, the one or more scores are determined based on numbers of occurrences of the one or more predefined categories associated with the financial-transaction histories having the matching location preference.

Figure 8:
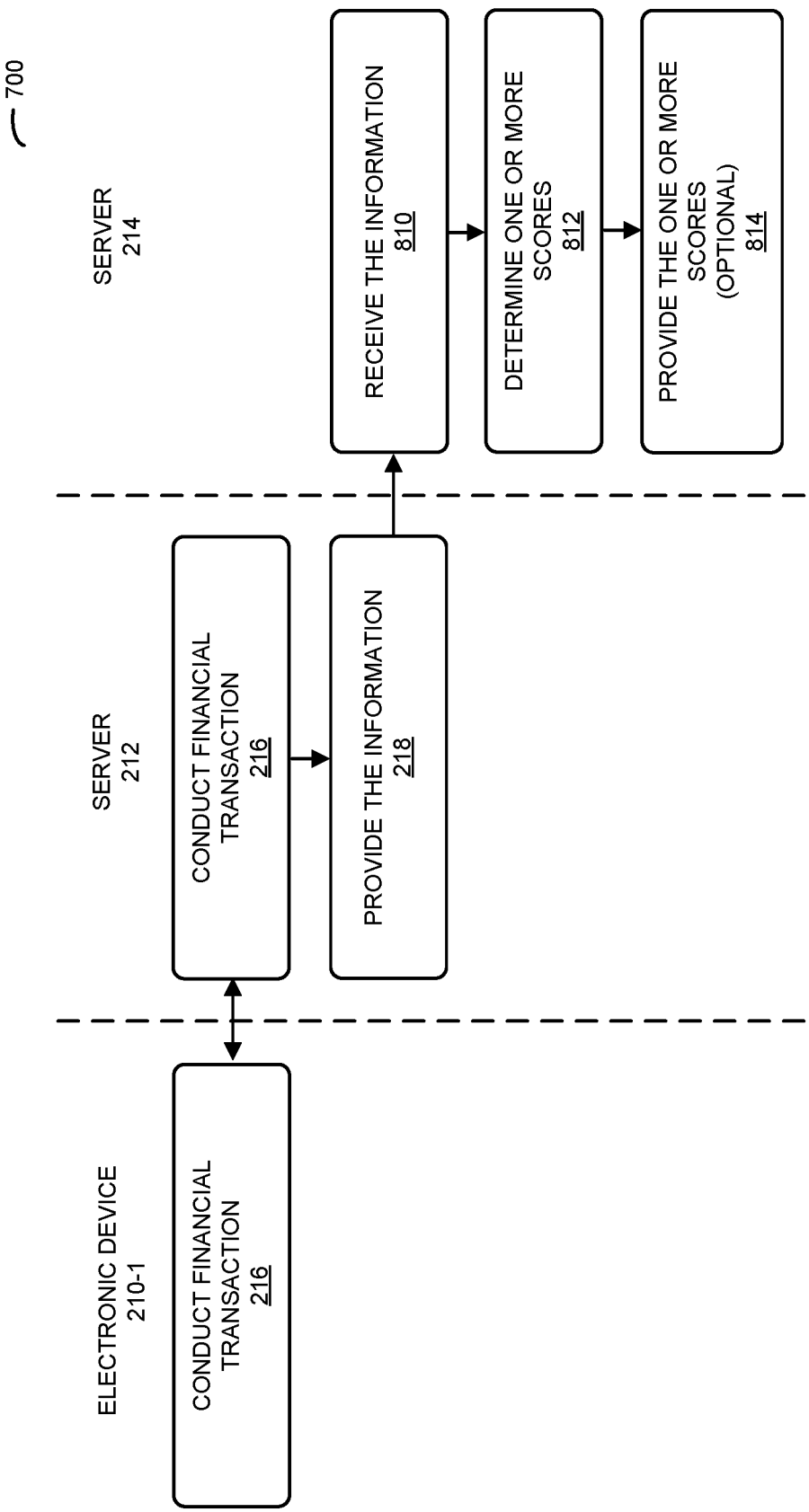
FIG. 8 is a flow chart illustrating the method of FIG. 7 in accordance with an embodiment of the present disclosure.

In an exemplary embodiment, the financial technique is implemented using one or more electronic devices (such as a computer or a portable electronic device, e.g., a cellular telephone) and one or more servers (such as a computer or a computer system), which communicate through a network, such as a cellular-telephone network and/or the Internet. This is illustrated in FIG. 8, which presents a flow chart illustrating method 700 (FIG. 7).

During the method, the user of electronic device 210-1 (such as the individual) may conduct the financial transaction (operation 216) with the counterparty. The financial transaction may be conducted electronically via electronic device 210-1. Server 212, which is associated with the counterparty or the financial institution that provides a financial vehicle, may convey the information (operation 218) specifying the financial transaction to server 214 (which is associated with the provider of the financial technique).

After receiving the information (operation 810), server 214 may determine the one or more scores (operation 812) indicating the likelihood that the financial transaction is associated with the one or more predefined categories based on the location preferences of the individual and the location of the financial transaction.

Then, server 214 may optionally provide the one or more scores (operation 814) and the associated predefined categories to the third party (not shown).

In an exemplary embodiment, the financial technique identifies the location preferences of the user based on their financial-transaction history. In particular, predefined categories may be identified by clustering these predefined categories around the locations of associated financial transactions. For example, a location preference may be identified in which the user's spending in San Francisco tends to be clustered around entertainment and bars, while the same user's spending in Mountain View tends to be clustered around groceries. These location preferences can then be used to provide probabilistic scores for categorization based on location.

Thus, if the user conducts a financial transaction that cannot be categorized, the user's location preference(s) may be used to categorize the financial transaction. For example, if there are two possible predefined categories associated with the financial transaction (such as those that approximately match the counterparty name in the financial transaction), and the user has a strong preference for a predefined category when there is a particular location or region in their financial-transaction history, this location preference may be used to determine the relative weights of the two possible predefined categories based on the location associated with the financial transaction. In essence, this embodiment of the financial technique leverages the fact that the user's behavioral pattern also drives their spending patterns.

For example, Jane Doe may live in Mountain View and work in San Francisco. She does most of her grocery shopping closer to home (especially around the weekdays). Moreover, she generally goes for happy hour after work on Friday. Furthermore, she also heads to the city on weekends, and most of those visits tend to be museums or plays. Using this information, cluster of spending rules may be identified based on Jane's location preferences.

If a subsequent financial transaction cannot be categorized, but the location and time are known (e.g., 'Jake's Place, Fri 06/1331.0'), the location preferences may be used to distinguish between two possible predefined categories, the merchants 'Jake's Pharmacy' and 'Jake's Drinks.' Because these two predefined categories are very similar, it may be difficult to categorize the financial transaction. However, using the location preferences, 'Jake's Drinks' can be determined as the likely predefined category for the financial transaction given that Jane tends to visit bars on Friday evenings.

Note that a score based on the location preference(s) of a user u to a business b for disambiguating financial-transaction categories may be calculated as:

$$LocalityOfSpendScore(u,b) = Bayesian(b \text{ in locality cluster}(u)),$$

$$Bayesian(b \text{ in locality cluster}(u)) = integral(\text{pattern recognizer}(b|u,t) \cdot \text{posterior probability}(t,b) \cdot d(t)),$$

$$\text{pattern recognizer}(b|u,t) = p(u,b) \cdot p(b,t)/integral(p(u,b)p(b,t) \cdot d(b)), \text{ and}$$

$$\text{posterior probability}(t,b) = p(t) \cdot p(b,t)/p(b),$$

where locality cluster(u) equals a list of businesses from user u's financial-transaction history clustered, t equals the time interval over which u's financial-transaction history is integrated, d(t) denotes the integration of user u's financial-transaction history over time, d(b) denotes the integration over all businesses with which user u conducted business, p(u, b) equals the probability/frequency of occurrence of business b in user u's financial-transaction history, p(b, t) equals the probability/frequency of occurrence of business b during time interval t, p(t) equals the probability/frequency of occurrence of time interval t, p(u, t) equals the probability/frequency of occurrence of time interval t in user u's financial-transaction history, and p(u) equals the probability/frequency of occurrence of user u over all other users. In this analysis, score based on location preferences is determined using random time intervals. Moreover, in the sequential use of Bayes' formula, when more financial-transaction history data become available after calculating a posterior distribution, the posterior becomes the next prior. The selection of time intervals is determined in conjunction with the locality of the user at the specified time interval. This helps to identify whether the user is traveling and if the user spends money in a location during a specific time interval.

In some embodiments of methods 100 (FIGS. 1 and 2), 300 (FIGS. 3 and 4), 500 (FIGS. 5 and 6), and 700 (FIGS. 7 and 8), there may be additional or fewer operations. Moreover, the order of the operations may be changed, and/or two or more operations may be combined into a single operation.

Figure 9:
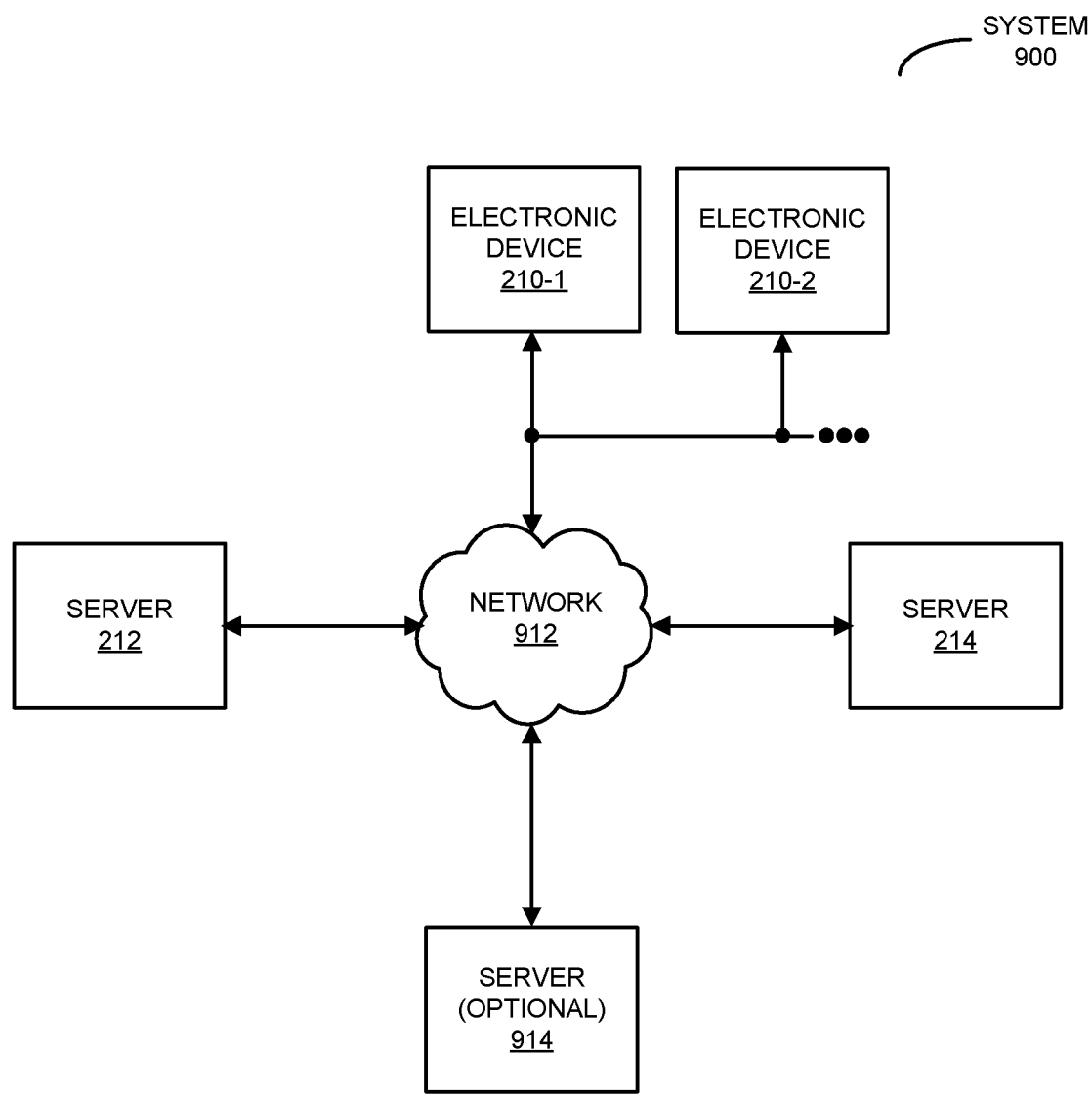
FIG. 9 is a block diagram illustrating a system that performs the methods of FIGS. 1-8 in accordance with an embodiment of the present disclosure.

We now describe embodiments of a system and the computer system, and their use. FIG. 9 presents a block diagram illustrating a system 900 that can be used, in part, to perform operations in methods 100 (FIGS. 1 and 2), 300 (FIGS. 3 and 4), 500 (FIGS. 5 and 6), and 700 (FIGS. 7 and 8). In this system, during the financial technique one or more electronic devices 210 may use a software product, such as a software application that is resident on and that executes on one or more electronic devices. (Alternatively, the one or more users may interact with a web page that is provided by server 212 via network 912, and which is rendered by a web browser on the one or more electronic devices 210. For example, at least a portion of the software application may be an application tool that is embedded in the web page, and which executes in a virtual environment of the web browser. Thus, the application tool may be provided to electronic devices 210 via a client-server architecture.) This software application may be a standalone application or a portion of another application that is resident on and which executes on the one or more electronic devices 210 (such as a software application that is provided by server 212 or that is installed and which executes on the one or more electronic devices 210). In an exemplary embodiment, the software product may be financial software, such as accounting software, income-tax software or payroll software.

During the financial technique, the user of one of electronic devices 210 (such as electronic device 210-1) may use the financial software to conduct the financial transaction with server 212 of a counterparty via network 912. Then, server 212 may convey the information specifying the financial transaction to server 214 via network 912.

After receiving the information, server 214 may determine the one or more scores (operation 812) indicating the likelihood that the financial transaction is associated with the one or more predefined categories. The one or more scores may be based on: the numbers of occurrences of the one or more predefined categories in financial-transaction histories of a subset of a group of individuals (who have a common spending pattern as the user) and a value of the financial transaction (which may specify the subset); financial-transaction preferences of the user (such as a business-size preference and/or a predefined-category preference); spending preferences of the user; and/or the location preferences of the user and the location of the financial transaction.

Then, server 214 may optionally provide the one or more scores (operation 814) and the associated predefined categories to optional server 914 (which is associated with third party) via network 912.

Note that information in system 900 may be stored at one or more locations in system 900 (i.e., locally or remotely). Moreover, because this data may be sensitive in nature, it may be encrypted. For example, stored data and/or data communicated via network 912 may be encrypted.

FIG. 10 presents a block diagram illustrating a computer system 1000 that performs methods 100 (FIGS. 1 and 2), 300 (FIGS. 3 and 4), 500 (FIGS. 5 and 6), and 700 (FIGS. 7 and 8), such as server 214 (FIGS. 2, 4, 6, 8 and 9). Computer system 1000 includes one or more processing units or processors 1010, a communication interface 1012, a user interface 1014, and one or more signal lines 1022 coupling these components together. Note that the one or more processors 1010 may support parallel processing and/or multi-threaded operation, the communication interface 1012 may have a persistent communication connection, and the one or more signal lines 1022 may constitute a communication bus. Moreover, the user interface 1014 may include: a display 1016, a keyboard 1018, and/or a pointer 1020, such as a mouse.

Memory 1024 in computer system 1000 may include volatile memory and/or non-volatile memory. More specifically, memory 1024 may include: ROM, RAM, EPROM, EEPROM, flash memory, one or more smart cards, one or more magnetic disc storage devices, and/or one or more optical storage devices. Memory 1024 may store an operating system 1026 that includes procedures (or a set of instructions) for handling various basic system services for performing hardware-dependent tasks. Memory 1024 may also store procedures (or a set of instructions) in a communication module 1028. These communication procedures may be used for communicating with one or more computers and/or servers, including computers and/or servers that are remotely located with respect to computer system 1000.

Memory 1024 may also include multiple program modules (or sets of instructions), including: transaction module 1030 (or a set of instructions), categorizing module 1032 (or a set of instructions), and/or encryption module 1034 (or a set of instructions). Note that one or more of these program modules (or sets of instructions) may constitute a computer-program mechanism.

During the financial technique, transaction module 1030 may collect or may access data 1036 (via communication module 1028 and communication interface 1012) associated with software product 1038 used by users 1040. This data may include information associated with financial transactions 1042.

Then, categorizing module 1032 may determine one or more scores 1044 indicating the likelihood that one of financial transactions 1042 is associated with one or more predefined categories 1046. The one or more scores 1044 may be based on: the numbers of occurrences 1048 of the one or more predefined categories in financial-transaction histories 1050 of a subset 1054 of a group 1052 of individuals (who have a common spending pattern 1056 as one of users 1040) and a value of the financial transaction (which may specify the subset, and which may be included in data 1036); financial-transaction preferences 1058 of the one of users 1040 (such as a business-size preference 1060 and/or a predefined-category preference 1062); spending preferences 1064 of the one of users 1040; and/or location preferences 1066 of the one of users 1040 and a location of the financial transaction (which may be included in data 1036).

Then, categorizing module 1032 may optionally provide (via communication module 1028 and communication interface 1012) the one or more scores 1044 and the associated predefined categories to a third party 1068.

In some embodiments, prior to determining the one or more scores 1044, categorizing module 1032 optionally assigns the one of users 1040 to group 1052 based on an analysis of financial-transaction histories 1050 of the one of the users 1040 and group 1052.

Because information used in the financial technique may be sensitive in nature, in some embodiments at least some of the data stored in memory 1024 and/or at least some of the data communicated using communication module 1028 is encrypted or decrypted using encryption module 1034.

Instructions in the various modules in memory 1024 may be implemented in: a high-level procedural language, an object-oriented programming language, and/or in an assembly or machine language. Note that the programming language may be compiled or interpreted, e.g., configurable or configured, to be executed by the one or more processors 1010.

Although computer system 1000 is illustrated as having a number of discrete items, FIG. 10 is intended to be a functional description of the various features that may be present in computer system 1000 rather than a structural schematic of the embodiments described herein. In some embodiments, some or all of the functionality of computer system 1000 may be implemented in one or more application-specific integrated circuits (ASICs) and/or one or more digital signal processors (DSPs).

Computer system 1000, as well as electronic devices, computers and servers in system 1000, may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 912 (FIG. 9) may include: the Internet, World Wide Web (WWW), an intranet, a cellular-telephone network, LAN, WAN, MAN, or a combination of networks, or other technology enabling communication between computing systems.

Electronic devices 210 (FIGS. 2, 4, 6, 8 and 9), server 212 (FIGS. 2, 4, 6, 8 and 9), server 214 (FIGS. 2, 4, 6, 8 and 9), system 900 (FIG. 9), and/or computer system 1000 may include fewer components or additional components. Moreover, two or more components may be combined into a single component, and/or a position of one or more components may be changed. In some embodiments, the functionality of electronic devices 210 (FIGS. 2, 4, 6, 8 and 9), server 212 (FIGS. 2, 4, 6, 8 and 9), server 214 (FIGS. 2, 4, 6, 8 and 9), system 900 (FIG. 9) and/or computer system 1000 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for identifying a category of a transaction described by an electronic record, the method comprising:
    receiving the electronic record, wherein information included in the electronic record incompletely describes the transaction, and wherein the information identifies at least a portion of a name of a counterparty that participated in the transaction;
    comparing the information to a set of categories to identify one or more categories;
    determining that more than one category has been identified;
    disambiguating the category of the transaction by:
        assigning a user to a group of individuals including two or more individuals other than the user based on an analysis of transaction histories of the two or more individuals other than the user and a transaction history of the user by:
            identifying multiple groups of individuals by performing a clustering analysis of transactions in transaction histories of the individuals in the multiple groups of individuals using an unsupervised-learning technique;
            determining distance values between transactions in the transaction history of the user and the transactions in the transaction histories of the individuals in the multiple groups of individuals; and
            assigning the user to the group of individuals based on the distance values;
        determining that the user has a common spending pattern with the two or more individuals other than the user based on:
            transaction values in the transaction histories of the two or more individuals other than the user; and
            one or more transaction values in the transaction history of the user;
        for each category in the one or more categories, determining a score for the category based on a number of occurrences of the category in the transaction histories of the two or more individuals other than the user that have the common spending pattern with the user, wherein the score indicates a likelihood that the transaction is associated with the category; and
        categorizing the transaction as belonging to a given category from the one or more categories based on the score for each category of the one or more categories; and
    automatically targeting a service to the user based on the given category determined through the disambiguating.

2. The method of claim 1, wherein each category from the one or more categories includes one of: a merchant name and an attribute associated with one or more merchants.

3. The method of claim 1, wherein the score for each category of the one or more categories is normalized by numbers of occurrences of the one or more categories in the transaction histories of the two or more individuals other than the user.

4. The method of claim 1, wherein the information includes a value of the transaction.

5. The method of claim 4, wherein the value of the transaction is used to identify the two or more individuals having a common spending pattern with the user.

6. The method of claim 1, wherein:
    each category in the categories corresponds to a different type of product or service of a plurality of types of products and services for transactions in the transaction histories of the two or more individuals other than the user and a transaction history of the user, and
    categorizing the transaction comprises determining a type of product or service from the plurality of types of products and services that the transaction is most likely associated with.

7. The method of claim 1, wherein:
    the information comprises an identifier for a merchant for the transaction,
    determining the score for the category comprises using a number of times that the two or more individuals have mapped the merchant to the category for previous transactions in the transaction histories of the two or more individuals other than the user, and
    the given category corresponds to a category in the categories that the two or more individuals have mapped to the merchant.

8. The method of claim 7, wherein determining the score for the category comprises calculating the score as a function of a first number of individuals in the two or more individuals and a second number of individuals in the two or more individuals, wherein the second number of individuals indicates how many of the two or more individuals have used the category at least once.

9. A non-transitory computer-readable medium comprising instructions that, when executed by a processor, cause the processor perform a method for identifying a category of a transaction described by an electronic record, the method comprising:
    receiving the electronic record, wherein information included in the electronic record incompletely describes the transaction, and wherein the information identifies at least a portion of a name of a counterparty that participated in the transaction;
    comparing the information to a set of categories to identify one or more categories;
    determining that more than one category has been identified;
    disambiguating the category of the transaction by:
        assigning a user to a group of individuals including two or more individuals other than the user based on an analysis of transaction histories of the two or more individuals other than the user and a transaction history of the user by:
  identifying multiple groups of individuals by performing a clustering analysis of transactions in transaction histories of the individuals in the multiple groups of individuals using an unsupervised-learning technique;
  determining distance values between transactions in the transaction history of the user and the transactions in the transaction histories of the individuals in the multiple groups of individuals; and
  assigning the user to the group of individuals based on the distance values;
determining that the user has a common spending pattern with the two or more individuals other than the user based on:
  transaction values in the transaction histories of the two or more individuals other than the user; and
  one or more transaction values in the transaction history of the user;
for each category in the one or more categories, determining a score for the category based on a number of occurrences of the category in the transaction histories of the two or more individuals other than the user that have the common spending pattern with the user, wherein the score indicates a likelihood that the transaction is associated with the category; and
categorizing the transaction as belonging to a given category from the one or more categories based on the score for each category of the one or more categories; and
automatically targeting a service to the user based on the given category determined through the disambiguating.

10. The non-transitory computer-readable medium of claim 9, wherein each category from the one or more categories includes one of: a merchant name and an attribute associated with one or more merchants.

11. The non-transitory computer-readable medium of claim 9, wherein the score for each category of the one or more categories is normalized by numbers of occurrences of the one or more categories in the transaction histories of the two or more individuals other than the user.

12. The non-transitory computer-readable medium of claim 9, wherein the information includes a value of the transaction.

13. The non-transitory computer-readable medium of claim 12, wherein the value of the transaction is used to identify the two or more individuals having a common spending pattern with the user.

14. The non-transitory computer-readable medium of claim 9, wherein:
  each category in the categories corresponds to a different type of product or service of a plurality of types of products and services for transactions in the transaction histories of the two or more individuals other than the user and a transaction history of the user, and
  categorizing the transaction comprises determining a type of product or service from the plurality of types of products and services that the transaction is most likely associated with.

15. The non-transitory computer-readable medium of claim 9, wherein:
  the information comprises an identifier for a merchant for the transaction,
  determining the score for the category comprises using a number of times that the two or more individuals have mapped the merchant to the category for previous transactions in the transaction histories of the two or more individuals other than the user, and
  the given category corresponds to a category in the categories that the two or more individuals have mapped to the merchant.

16. The non-transitory computer-readable medium of claim 15, wherein determining the score for the category comprises calculating the score as a function of a first number of individuals in the two or more individuals and a second number of individuals in the two or more individuals, wherein the second number of individuals indicates how many of the two or more individuals have used the category at least once.

17. A computer system, comprising:
a processor; and
non-transitory computer-readable medium comprising instructions that, when executed by the processor, cause the computer system to perform a method for identifying a category of a transaction described by an electronic record, the method comprising:
  receiving the electronic record, wherein information included in the electronic record incompletely describes the transaction, and wherein the information identifies at least a portion of a name of a counterparty that participated in the transaction;
  comparing the information to a set of categories to identify one or more categories;
  determining that more than one category has been identified;
  disambiguating the category of the transaction by:
    assigning a user to a group of individuals including two or more individuals other than the user based on an analysis of transaction histories of the two or more individuals other than the user and a transaction history of the user by:
      identifying multiple groups of individuals by performing a clustering analysis of transactions in transaction histories of the individuals in the multiple groups of individuals using an unsupervised-learning technique;
      determining distance values between transactions in the transaction history of the user and the transactions in the transaction histories of the individuals in the multiple groups of individuals; and
      assigning the user to the group of individuals based on the distance values;
    determining that the user has a common spending pattern with the two or more individuals other than the user based on:
      transaction values in the transaction histories of the two or more individuals other than the user; and
      one or more transaction values in the transaction history of the user;
    for each category in the one or more categories, determining a score for the category based on a number of occurrences of the category in the transaction histories of the two or more individuals other than the user that have the common spending pattern with the user, wherein the score indicates a likelihood that the transaction is associated with the category; and categorizing the transaction as belonging to a given category from the one or more categories based on the score for each category of the one or more categories; and automatically targeting a service to the user based on the given category determined through the disambiguating.

18. The computer system of claim 17, wherein each category from the one or more categories includes one of: a merchant name and an attribute associated with one or more merchants.

19. The computer system of claim 17, wherein the score for each category of the one or more categories is normalized by numbers of occurrences of the one or more categories in the transaction histories of the two or more individuals other than the user.

20. The computer system of claim 17, wherein the information includes a value of the transaction.

\* \* \* \* \*